Jan. 22, 1952  E. M. GREER ET AL  2,583,295
FLUID-OPERATED POWER SYSTEM
Filed June 14, 1944  2 SHEETS—SHEET 1
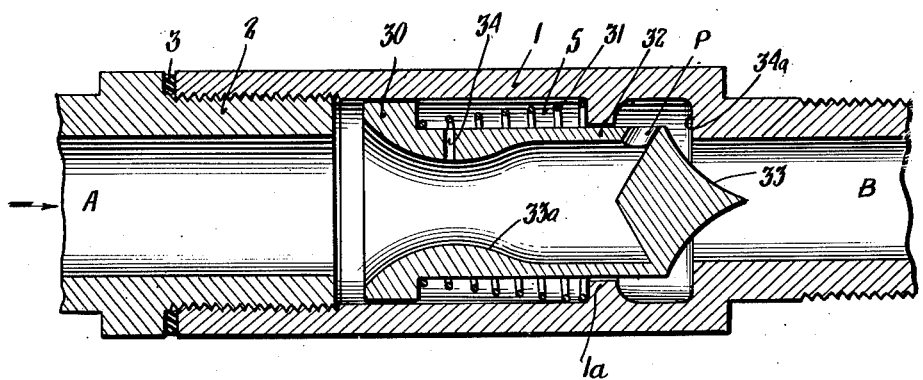
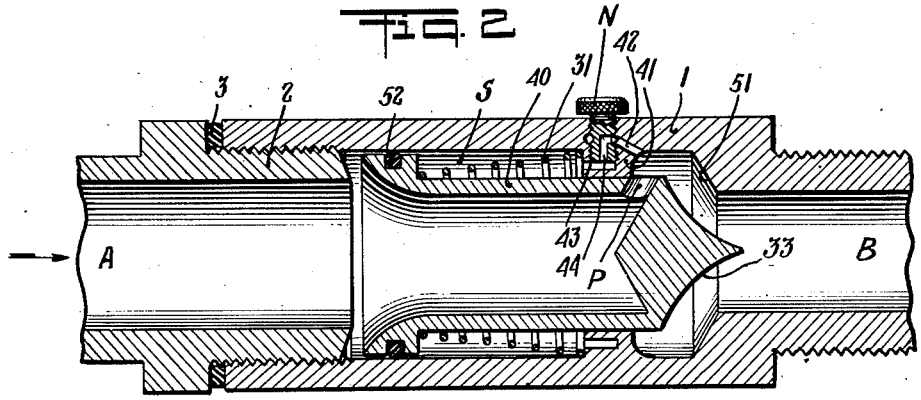
INVENTORS
Jean Mercier and
BY Edward M. Greer
Mock & Blum
ATTORNEYS Jan. 22, 1952     E. M. GREER ET AL     2,583,295
FLUID-OPERATED POWER SYSTEM
Filed June 14, 1944
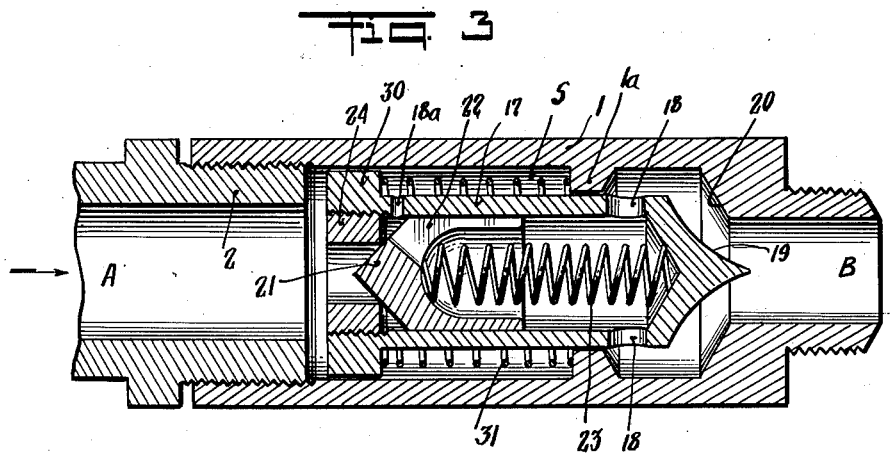
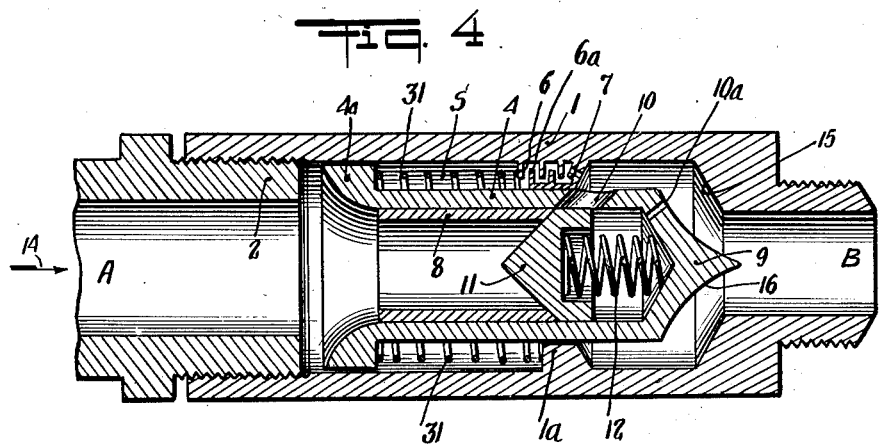
INVENTORS
Jean Mercier and
BY Edward M. Greer
Mock + Blum
ATTORNEYS Patented Jan. 22, 1952

2,583,295

UNITED STATES PATENT OFFICE 2,583,295

FLUID-OPERATED POWER SYSTEM

Edward M. Greer, West Hempstead, and Jean Mercier, New York, N. Y.; said Greer assignor to said Mercier Application June 14, 1944, Serial No. 540,276

2 Claims. (Cl. 137—153)

Our invention relates to a new and improved method of and means for controlling the flow of fluid in a fluid-operated power system. The fluid may be a liquid or a gas. If the fluid is a gas, the system can operate the motor-device or motor-devices by compressed gas, or it can be a vacuum-power system.

Without restricting the scope of the invention, it relates particularly to the control of the motive fluid in fluid-operated power systems which are used in airplanes, for operating turrets, landing-gear, and other parts.

In such systems, a forward flow of fluid is produced through the entire pipe line and through the motor-device by a pump from any source of pressure or vacuum. The pump or other source of pressure or vacuum is connected to the cylinder or other motor-device, by a pipe line. There is usually a return pipe-line from the motor device to the pump or to the source of pressure or vacuum.

The entire pipe system and the motor-device may be filled with the motive liquid or other motive fluid.

Due to wear or accidents or enemy fire, the pipe line is frequently subjected to leakage, and said pipe line may be destroyed.

In such systems, even if the master valve is closed, and the entire system is in perfect working condition, there may be a slow internal leakage flow of the motive liquid or other motive fluid through the system, due to leakage between the master valve and its valve-seat, leakage between the piston and cylinder of the motor-device, etc. The system may be designed so that such internal leakage flow is negligible, or the system may be designed to have a slow internal leakage flow. No fluid normally leaks out of the system, as the result of such internal leakage flow.

When the master valve is opened, the motive fluid flows through the system at a velocity which exceeds the velocity of internal leakage flow.

If the pipe system is intact and in normal working condition, the respective master-valve may be opened to operate a part, such as the landing-gear of the airplane, which is operated only intermittently. In such case, the period of operation of such part, such as the landing-gear, requires a predetermined period of operation, plus an additional safety-period. In such case, we use a control unit in which the flow of motive fluid is stopped after the motive liquid has flowed through the control period at a velocity which exceeds the internal leakage velocity, plus the safety period. This does not depend upon the velocity of the flowing liquid, as long as said velocity exceeds the velocity of internal leakage flow.

In another case, as in operating the turret of an airplane, which must be operated continuously during long periods, the control unit is operated to stop the flow of motive fluid after the master valve has been opened, after the motive fluid has flowed through the control unit at more than normal operating velocity, during a predetermined period.

Numerous additional objects and advantages of my invention will be stated in the annexed description and drawings, which illustrate preferred embodiments thereof.

Fig. 1 is a longitudinal cross-section of a control unit made according to our invention. This unit stops the flow of motive fluid to the motor-device, at the end of a predetermined delay period, during which the flow of the motive fluid exceeds normal operating velocity. This delay period may be of any desired length.

For example, the control unit of Fig. 1 may be used to operate the turret of an airplane, or other device which must be continuously operated during a long period of time. When the master valve is opened, and the power system is in normal working condition, the motive liquid will flow at normal operating velocity. The control unit of Fig. 1 will stop the flow of motive fluid, only after a predetermined delay period during which the motive fluid has flowed through the control unit at more than normal operating velocity.

Fig. 2 is a longitudinal cross-section of a second embodiment, which operates in the same manner as Fig. 1.

Fig. 3 is a longitudinal sectional view of a third embodiment, which includes an auxiliary valve 21. In this embodiment, the control unit will shut off the flow of motive fluid, at the end of a predetermined delay period after the master valve has been opened, irrespective of the velocity of flow of the motive fluid during said delay period. Hence, in the embodiment of Fig. 3, after the motive fluid has flowed through the control unit during a predetermined period, even at normal operating velocity, the additional flow of motive fluid will be stopped, if the master valve remains open.

Hence, the embodiment of Fig. 3 is especially adapted for operating the landing-gear of an airplane, for example. If it requires three seconds to operate said landing-gear, as an example, plus a safety period of one second, the control unit of Fig. 3 will stop the flow of motive fluid, after said fluid has flowed through the control unit during a period of four seconds, at more than internal leakage velocity.

Fig. 4 is a longitudinal sectional view of a fourth embodiment, which operates on the same principle as the embodiment of Fig. 3.

Fig. 1 shows pipes 1 and 2, which are part of the pipe-line between the source of power and the motor-device. The source of power and the motor-device are not shown in the drawings, because they are well-known per se. The fluid enters pipe 2 at inlet zone A, and it passes out of pipe 1 at outlet zone B. The master valve, not shown, may be located in any part of the pipe line. It may be anterior zone A, or it may succeed zone B.

Pipes 1 and 2 are connected by cooperating threads, and a gasket 3 provides a fluid-tight joint.

Hollow valve-body 32 has a cylindrical piston-head 30, which fits fluid-tight and slidably against the interior cylindrical wall of pipe 1. Said piston-head 30 can have conventional piston-rings of the type of the ring 52 which is shown in Fig. 2. Pipe 1 has an inner cylindrical rib 1a, against which the cylindrical valve-body 32 fits fluid-tight and slidably. The valve-body 32 may have said piston rings adjacent rib 1a.

Valve-body 32 has a valve-head 33, which can fit fluid-tight against a part of the valve-seat 34a of pipe 1. In this design, valve-head 33 has line contact against valve-seat 34a.

Valve-body 32 is hollow and it has a narrow transverse bore 34, which extends through the constricted wall-part 33a of the hollow valve-body 32.

The piston-head 30 and the rib 1a, define a checking space or checking-chamber S, which is filled with the respective fluid, when the parts are in the normal open operating position of Fig. 1. This fluid is the same as the motive fluid. Said motive fluid may be of any type, such as a gas or oil or other liquid. In said normal open operating position, motive fluid which flows cut of outlet zone B, is supplied to the motor-device when the master valve is open. The mass of fluid which is located in the checking-chamber S, under said condition of normal operation, is designated as the checking-fluid. Said checking-chamber S is enclosed save for its outlet port 34, save that we may provide a small leakage at rib 1a, where the piston-body 32 has a slide fit. This leakage should be very small. The rear wall of said checking-chamber S is the front transverse annular wall of the piston-head 30. Said chamber S is of continuous and equal annular cross-section.

A compression spring 31 is located in checking-chamber S. Said spring 31 rearwardly biases the valve-body 32, against the forward force which is exerted upon the valve-body 32, by the pressure head of the forwardly-flowing motive fluid.

When the fluid flows at predetermined normal operating velocity when the master valve is open, the opposed biasing force of spring 31 exceeds the force of the pressure of the fluid head, so that valve-head 33 is maintained in the normal open operating position which is shown in Fig. 1. When the forward flow of motive fluid is stopped by closing the master valve, valve-body 32 may be held against rearward movement from said normal open position by a suitable stop, or valve-body 32 may then be moved rearwardly by spring 31, until piston head 30 abuts pipe 2. Spring 31 may be under suitable initial compression.

Valve-body 32 is provided with a port P, which is located longitudinally intermediate rib 1a and valve-seat 34a, when valve-body 32 is in the open position of Fig. 1. There may be a plurality of ports P. As an example, there may be three ports P.

Under normal operating conditions, when the master valve anterior zone A is opened in the power system, and if the power system is a compression system, the motive fluid flows at normal velocity through pipe 2, into hollow valve-body 32 at its open front end, through port or ports P, and out of zone B of pipe 1, to the cylinder or other motor-device. The velocity of flow of the fluid, under such normal operating conditions, is less than a predetermined maximum.

At normal operating predetermined flow velocity, the forward force of the pressure-head of the forwardly flowing fluid cannot move the valve-body 32 against the force of spring 31, to the right, namely, forwardly of the normal open operating position which is shown in Fig. 1.

When the forward flow of the fluid towards zone B exceeds said normal maximum velocity, the forward force of the pressure-head of the flowing liquid exceeds the opposed force of the biasing spring 31, and the valve-head 33 will be moved to closing position, at the end of a predetermined closing period, during which checking-fluid is aspirated out of the checking-chamber S, through port 34.

When the valve-body 32 has been moved from the normal operating position to its closing position, in which the valve-head 33 of valve-body 32 abuts valve-seat 34a, at least part of the mass of checking fluid which initially fills chamber S, when said chamber S has the normal volume shown in Fig. 1, will have been removed from chamber S. The length of the closing period is thus regulated by the rate at which the checking-fluid is removed from chamber S when the velocity exceeds normal velocity, either by aspiration or pressure or both. The biasing force of spring 31 may vary only very slightly, or to any desired extent, during the closing movement of valve-body 32.

Hence if the embodiment of Fig. 1 is used for controlling the flow of motive fluid for operating a motor-device for actuating a turret, for example, valve-head 33 will remain spaced from valve-seat 34a as long as the power system is in normal working order. If the power system which is located after zone B leaks for any reason, and the master valve is open, the motive fluid will flow through the control unit at more than normal operating velocity. After a predetermined delay period, which may be very short or of any desired length, under said condition of excessive velocity, valve-head 33 will be moved against valve seat 34a, and the pressure of the fluid in zone A and in the control unit will stop the flow of motive fluid through the control unit, until the leak is repaired.

Fig. 2 shows a modified hollow valve-body 40. The pipe 1 has a tapered valve-seat 51, instead of the non-tapered valve-seat 34a. The pipe 1 is provided with an integral extension 41, which has an inner cylindrical wall against which valve-body 40 fits slidably and fluid-tight. Said extension 41 has a narrow bore 42.

A nipple N has a shank which is threaded into a tapped bore of pipe 1. Said shank has an inner recess 44. The wall of the shank is perforated, to establish communication between recess 44 and bore 42. A narrow passage 43 is provided between space S and recess 44. The piston-head of valve-body 40 has a piston-ring or gasket 52. The nipple N can be adjustably seated in the pipe 1, by means of the threaded connection between nipple N and the tapped bore of pipe 1, in order to control the velocity of flow of the checking-fluid out of the checking chamber S, through bore 42.

In the embodiment of Fig. 2, if the forward velocity of flow of the motive fluid exceeds the predetermined normal operating velocity when the master valve is opened, the pressure-head of the motive fluid moves valve-body 40 forwardly out of its normal open operating position which is shown in Fig. 2, thus forcing the checking-fluid out of the checking-chamber S at a regulated rate, through passage 43, recess 44 and bore 42. As in Fig. 1, the period of delay in stopping the flow of liquid is determined substantially by the rate at which the checking-fluid is removed from chamber S. The length of the closing movement of valve-body 40 may be short, so that the opposing force of spring 31 may remain substantially constant during the closing movement, as in the embodiment of Fig. 1. This is optional, because the counter force of spring 31 may increase as desired, during the closing movement. Preferably, only part of the mass of checking-fluid is forced out of chamber S, during the closing movement, in each embodiment disclosed herein.

Fig. 3 shows the pipe 1 provided with a hollow and longitudinally slidable valve-body 17, which has a piston-head 30. This embodiment has the checking-chamber or space S, and a compression spring 31, as in the previous embodiments. Valve-body 17 has ports 18, and a valve-head 19; and pipe 1 has a valve-seat 20.

A nut 24 is threaded into one end of valve-body 17. An auxiliary valve 21, which has a port 22, fits slidably, and either fluid-tight or non-fluid-tight, against the inner cylindrical wall of valve-body 17. An auxiliary spring 23 rearwardly biases auxiliary valve 21 so that its rear or left-hand valve-wall normally abuts the respective transverse wall of the nut 24, which serves as a valve-seat.

The valve-body 17 has a narrow bore 18a.

Fig. 3 shows the positions of the parts, when the control-valve anterior zone A is closed, so that no fluid is being forced towards zone A, save for the slow internal leakage flow, if any. When the system is thus out of operation, piston-head 30 may abut a suitable stop, such as the corresponding end of pipe 2, so that spring 31 may be under initial compression, when no motive fluid is flowing.

In this embodiment, the velocity of the motive fluid at which the flow of said motive fluid is stopped by the control unit, may be small, or it may differ only slightly from normal operating velocity, or from internal leakage flow. That is, the control-unit of Fig. 3 is responsive to small leakages, so that it will operate when the flow of the motive fluid slightly exceeds a relatively low maximum velocity. This maximum velocity may be the internal leakage velocity.

In Fig. 3, as soon as the velocity of flow exceeds the low normal velocity which results from internal leakage through the system, fluid is forced out of space S, through bore 18a, because the forward pressure of the fluid now exceeds the resistance of spring 31. Hence, there is a metered flow of checking-fluid out of space S, the rate of flow being controlled by the diameter of bore 18a. At the end of a predetermined period of delay, which is inversely proportional to the velocity of flow above the leakage flow which is the time required to operate the respective device plus a safety period, the valve head 19 is forced and held against valve-seat 20, thus stopping the flow of motive fluid. In each embodiment, when the normal velocity is exceeded, the pressure of the motive fluid keeps the respective valve in closing position.

Fig. 4 operates for the same purpose and on the same principle as Fig. 3.

In Fig. 4, the pipe 1 has a valve-body 4, which has a piston-head 4a. A sleeve 8 is fixed to the inner wall of valve-body 4. The auxiliary valve 11 is biased by compression-spring 12, against the valve-seat of sleeve 8. Fig. 4 shows the parts, when no fluid is flowing through the control-unit, because the control valve which is anterior zone A is closed. As previously noted, spring 31 may be under initial compression, when the parts are in the respective positions of Fig. 4, and the valve-body 4 may be stopped from moving rearwardly of its position shown in Fig. 4. Valve-body 4 has a port or ports 10, and it also has a relief leakage-bore 10a. Valve-body 4 has a valve-head 9, which has a valve-surface 16, which can abut valve-seat 15.

When motive fluid is forced at normal operating velocity in the direction of arrow 14 into and through zone A and through the succeeding zone B, the valve 11 is moved away from its valve-seat, so that the fluid can flow through port or ports 10 and through the space between valve-head 9 and valve-seat 15, into and through zone B. This is the same as the action of valve 21 of Fig. 3.

The pipe 1 is provided at its rib 1a, with a series of fins 6. The valve-body 4 has a series of fins 6a. These fins define a narrow labyrinth or zigzag outlet for the fluid, out of space S. The outlet end of this labyrinth is the narrow bore 7.

When the velocity of the motive fluid exceeds the predetermined internal leakage velocity, the pressure of the motive fluid urges valve 4 forwardly until its valve-head 9 abuts valve-seat 15. The checking-fluid is forced out of space S at a regulated metered rate, so that the unit is closed by valve-head 9, at the end of the predetermined period plus a safety period. The control-unit is thus closed, after a predetermined volume of liquid has flowed through said control-unit at more than the internal leakage velocity. This maximum operating velocity can be as small as is desired.

In the embodiments of Figs. 3 and 4, the compression springs 23 and 12 produce respective constant differences between the respective pressure-heads of the motive fluid in zones A and B, so that the pressure-head of the flowing liquid is greater in zone A than in zone B, by a fixed amount, which is theoretically independent of the velocity of flow.

There is substantially a stream-line flow between valve-head 19 and valve-seat 20, and also between valve-head 9 and valve-seat 15 with little or no turbulence, in the designs illustrated in Figs. 3 and 4. Such design can be changed, in order to provide for any desired departure from stream-line flow at 19—20 and 9—15, with a corresponding increase in turbulence and pressure-head in the space between the valve-head and the valve-seat.

At the inlet end of the hollow-valve-body 17 or 4, there is a departure from stream-line flow, due to nut 24 and sleeve 8. This produces a turbulence and a loss of velocity-head at the inlet end of valve-body 17 or 4, with a corresponding increase in pressure-head of the motive fluid.

Hence, if the motor-cylinder is broken behind its piston, this causes a leak and an increase in velocity of flow of the motive fluid and the resultant turbulence will result in an increase of pressure-head which will exert the necessary closing force upon valve-body 17 or 4. The same result is secured if there is a leak in zone B, anterior the motor cylinder.

Hence, in the embodiments of Figs. 3 and 4, there are four factors which regulate the period of closing of valve-head 19 or valve-head 9, namely, the force of spring 23 or 12; the force of spring 31; the time required to remove enough checking-fluid to permit the valve 17 or 4 to close; and the increase in pressure head of the motive fluid which is produced by turbulence in the flowing liquid, with consequent reduction in velocity head.

This turbulence effect is an important advantage, because it minimizes the leakage of fluid out of the system when the line is broken.

By producing turbulence between valve-head 19 and seat 20, or between valve-head 9 and seat 15, which can be done by departing from stream-line flow, the period for removing enough fluid from space S, to permit the closing of the valve 17 or 4, can be decreased. That is, by producing turbulence at 19—20 or 9—15, such turbulence is also produced at the outlet of space S. This increases the effective difference of pressure head of the motive fluid between zone A and zone B, so that the increased pressure head of said motive fluid in zone A will move the valve-body forwardly with greater force, to force the checking-fluid more rapidly out of space S, thus diminishing the period of delay in closing the valve proportionately to the rate of flow in excess of leakage flow.

In a vacuum system, the suction is applied at zone B, and the power-cylinder or other motor-device is connected to zone A.

Considering Fig. 1, for example, when used in a vacuum system, the spring 31 and the pressure of the checking air in checking space S will prevent valve 33 from closing, unless the velocity of motive air or other motive gas through the unit, exceeds a predetermined operating velocity. When the velocity exceeds said maximum operating velocity, the air pressure in space S will decrease at a metered rate, so that the valve of the control-unit will be closed, after a predetermined period of delay. This applies to the other embodiments, so that the control-unit can be used for vacuum-brakes, for operating fans and other rotors by the flow of air through the system, and the like.

In each embodiment, irrespective of other details, the pressure head of the flowing motive fluid urges a closure valve to its closing position, against a biasing counter-force. Said biasing counter-force keeps the closure valve in open position, until the velocity of the motive fluid exceeds a predetermined maximum velocity. This maximum velocity may be an operating velocity or an internal leakage velocity. In each embodiment, the period of delay in closing the closure valve is regulated by the period which is required to remove a corresponding mass of checking-fluid from a checking-chamber. The pressure of the checking-fluid exerts an additional counter-force.

We have disclosed preferred embodiments of our invention, but numerous changes and omissions and additions can be made without departing from its scope.

We prefer to use a biasing spring or springs or other resilient or non-resilient biasing means, whose force remains substantially constant or constant during the movement of the closing valve to closing position, so that the period of closing is determined by the rate at which checking-fluid is removed from the checking-chamber, and said rate of removal, either by aspiration or pressure, remains constant during said closing movement. It is well-known to provide a soft spring, whose force remains substantially constant, if the spring is slightly deformed from a predetermined shape or dimension. The drawings are diagrammatic and not to scale, and the length of spring 31 may greatly exceed the distance of the closing movement of the closing valve, so that the spring is deformed only slightly during the closing movement.

The valve-head 9 can be of any shape. It can be of convex shape, as the shape of a part of a sphere.

As an example, when the flow through the embodiment of Fig. 4 is less than 0.1 gallon per minute, which is normal internal leakage flow, the valve 9 does not move out of the open position shown in Fig. 4.

When the liquid flows at a rate between 0.5–5.0 gallons per minute, the shut-off occurs after a total volume of 0.5 gallon has flowed through the control device, with a variation of plus or minus 10%. If the motive liquid is an oil, the amount of oil which flows through the system, up to the instant of shut-off, is affected only slightly if the viscosity of the oil is changed by a difference in temperature. This is an important advantage in using oils or other liquids, whose viscosity depends on temperature. The reason is that since the checking liquid is the same as the motive liquid, a change in viscosity will simultaneously affect the flow of the liquid through the control device and out of the checking-chamber. Since the liquid flows forwardly in the direction of the respective arrows, the solid closing heads 33, 19, and 9 are located at the front ends of the respective closing-valves.

We claim:

1. In a pipe-line of a fluid-operated power system through which fluid is forced longitudinally forwardly, the combination of a pipe-member which has an internal valve-seat, a hollow valve-body which has a longitudinal axis and which is located in said pipe-member rearwardly of said valve seat, said valve-body being open at its rear end and having a valve-head at its front end, said valve-head having an imperforate valve-surface which closes said pipe-member when said valve-body is in the closing position, said pipe-member having an internal rib rearwardly of said valve head and valve-seat, said valve-body fitting slidably in said internal rib, said valve-body having a laterally enlarged piston head rearwardly of said rib, said piston head fitting against the internal longitudinal wall of said pipe member, the space between said piston head and said rib and said valve-body providing a checking-chamber, said checking-chamber having only a lateral outlet port which connects said checking chamber directly to the interior of said hollow valve body, said valve-body having a lateral outlet port which is located rearwardly of said valve-head, said outlet port being lateral relative to said longitudinal axis, said lateral outlet port of said valve-body being located forwardly of said rib when said valve-body is in the opening position, biasing means which bias said valve-body to a rear opening position in which said imperforate valve surface is spaced rearwardly of said valve-seat, said biasing means being sufficiently strong to keep said valve-body in said opening position when the velocity of flow of said fluid is at or below a predetermined normal operating velocity, the force of said biasing means being insufficient to keep said valve-body in said opening position when said velocity exceeds said normal velocity, said valve-head and the inner wall of said pipe-member at said internal valve-seat being shaped to provide a passage when said valve-body is in said opening position, said passage converging towards said longitudinal axis, said outlet port of said checking-chamber being located only in said rib.

2. A combination according to claim 1, in which said hollow valve-body has an internal valve-seat, said hollow valve-body having an internal valve which is biased rearwardly towards said internal valve-seat, said internal valve stopping the entry of fluid into said hollow valve-body through its open rear end when said internal valve abuts said internal valve-seat, said internal valve obstructing the outlet port of said valve-body when said internal valve abuts said internal valve seat, said valve-head having a relief bore which is spaced from said imperforate valve surface.

EDWARD M. GREER.
JEAN MERCIER.

REFERENCES CITED

The following references are of record in the file of this patent:

UNITED STATES PATENTS

| Number | Name | Date |
|---|---|---|
| 572,211 | McCoy | Dec. 1, 1896 |
| 1,441,759 | Schwennker | Jan. 9, 1923 |
| 1,707,993 | Piquerez | Apr. 9, 1929 |
| 2,354,161 | Waterman | July 18, 1944 |

FOREIGN PATENTS

| Number | Country | Date |
|---|---|---|
| 288,716 | Germany | Nov. 13, 1915 |
| 640,907 | France | Apr. 7, 1928 |